United States Patent [19]

Lewis, Jr.

[11] 3,928,536

[45] Dec. 23, 1975

[54] PROCESSES FOR REMOVAL OF SULFUR DIOXIDE FROM GASES

[76] Inventor: George W. Lewis, Jr., 8138 Lockwood Lane, Indianapolis, Ind. 46217

[22] Filed: Mar. 14, 1973

[21] Appl. No.: 340,963

[52] U.S. Cl. .............. 423/242; 423/356; 423/437; 423/567
[51] Int. Cl.² ..................................... C01B 17/00
[58] Field of Search .................... 423/242–244, 423/512, 567, 569, 356, 437

[56] References Cited
UNITED STATES PATENTS

| | | | |
|---|---|---|---|
| 1,496,410 | 6/1924 | Doremus et al. | 423/244 |
| 2,739,039 | 3/1956 | Phelps | 423/512 |
| 3,510,253 | 5/1970 | Fattinger et al. | 423/242 |
| 3,524,720 | 8/1970 | Bauer | 423/567 |
| 3,533,748 | 10/1970 | Finfer et al. | 423/567 |

FOREIGN PATENTS OR APPLICATIONS 1,203,451  8/1970  United Kingdom

Primary Examiner—Oscar R. Vertiz
Assistant Examiner—Gregory A. Heller
Attorney, Agent, or Firm—Woodard, Weikart, Emhardt & Naughton

[57] ABSTRACT

A method is disclosed for treating flue gas and the like for sulfur dioxide removal and recovery. The gas, containing a minor but polluting amount of sulfur dioxide, is contacted with ammonia in a reaction chamber. The reaction product is caused to precipitate onto a heat sink where it is mechanically removed on a continuous basis. The removed compounds are recycled by one of three ways: (1) by subjecting them to carbon monoxide to obtain sulfur and ammonia, (2) by heating the materials in a vacuum to remove much of the sulfur dioxide, or (3) by volatilizing them and passing the vapors through a metal carbonate to obtain ammonia, carbon dioxide and a metal sulfite. In the second process ammonium sulfite is recycled to the reaction chamber and subsequently precipitates as ammonium bisulfite.

13 Claims, 4 Drawing Figures

PROCESSES FOR REMOVAL OF SULFUR DIOXIDE FROM GASES

DESCRIPTION OF THE PRIOR ART

Field of the Invention

This invention relates to the treatment of gases containing sulfur dioxide in order to reduce the sulfur dioxide content of the gas and for recovery of either sulfur dioxide or sulfur.

Background of the Invention

Many processes for removal of sulfur dioxide from combustion gases and the like have used ammonia by injecting the ammonia into the gases and thereafter passing the gases through a water spray to dissolve compounds of ammonia and sulfur dioxide which form. Because of the exposure of the aqueous solutions of these compounds to the air, much of the compounds which form become oxidized to form ammonium sulfates. Recycling of these sulfate compounds is much more difficult than recycling of the unoxidized compounds.

To overcome this problem of oxidation and to eliminate some of the disadvantages associated with the large amounts of water used in conventional processes, Cann, in U.S. Pat. No. 3,579,296, describes a process which does not use water spray to remove the ammonia and sulfur dioxide from the gases. The method of Cann removes the solids which form as a suspension in the gases with either a cyclonic separator or filter, and an electrostatic precipitator. The gases in Cann's process pass through the reaction chamber at such a high rate that substantially no materials deposit on the walls of the reaction chamber; but rather, substantially all solid materials formed remain suspended in the gases. Cann also has found it desirable to recycle some of the solid materials which he removes from the gases with his separation devices. The regeneration of ammonia in this process is accomplished by the anaerobic addition of the solid materials separated to alkaline earth metal oxides dissolved in water. The processes of the prior art often involve two or three separate processes and thus are relatively expensive.

SUMMARY OF THE INVENTION

The invention relates broadly to a process for reducing sulfur dioxide content of gases by adding ammonia to the gases and by precipitating solids on a heat sink surface across which the gases are passed at a relatively slow speed. This results in the production of solids which are not in solution form, thereby reducing the amount of sulfates which are formed. The invention also provides a very inexpensive method for removal of the solids from the gases.

The invention also relates to methods of recycling such removed solids by one of three ways: (1) by heating them in a vacuum to remove much of the sulfur dioxide from the compounds and thereby producing ammonium sulfite which can be recycled to the reaction chamber, (2) by passing carbon monoxide through the solids to produce ammonia for recycling and sulfur in elemental form for easy shipment and storage, or (3) by volatilizing the solids and passing the vapors through a finely divided solid metal carbonate to obtain ammonia, carbon dioxide, and a metal sulfite. The recycling methods are very inexpensive and simple and overcome many of the problems of the prior art recycling processes.

DESCRIPTION OF THE PREFERRED EMBODIMENT

Figure 1:
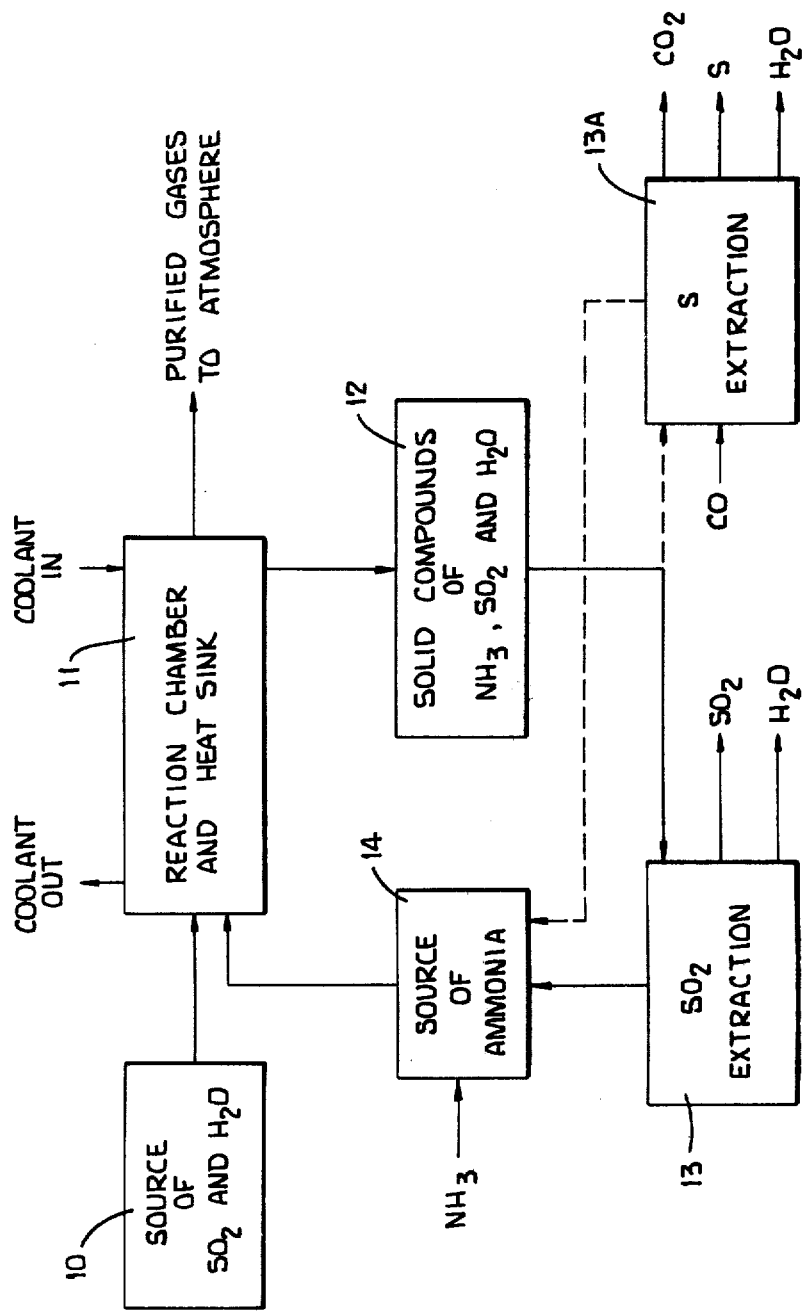
FIG. 1 is a block diagram of the invention.

Referring in particular to FIG. 1 there is illustrated a source of $SO_2$ and $H_2O$, 10 which can be combustion gases from sulfur-containing fuels such as coal, fuel oil or natural gas or from any other source of gases containing sulfur dioxide and water vapor, such as may be derived from the roasting of sulfur-containing ores, smelting operations, or metal casting operations. These gases are passed through a reaction chamber and heat sink 11 where they react with ammonia from a source of ammonia 14. The reaction chamber and heat sink 11 has a relatively large surface maintained below the temperature of the gases. In most instances the temperature of the large surface will need to be below 200°F and preferably the temperature of the large surface will be maintained at about 170°F. This large surface maintained at such a temperature will cause solids to precipitate from the gases. The gases are then allowed to pass to the atmosphere and the precipitated solids are continuously removed and accumulated in a storage area 12. The solid compounds include primarily ammonium bisulfite, ammonium pyrosulfite, and ammonium sulfite. Additionally fly ash may be present but this can be removed either prior to precipitation or subsequent to precipitation through conventional means well known in the art. The principal reactions which are involved can be described generally as follows:

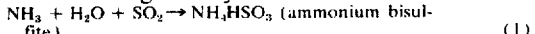
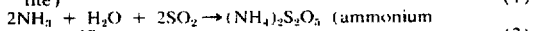
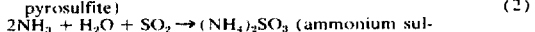

$NH_3 + H_2O + SO_2 \rightarrow NH_4HSO_3$ (ammonium bisulfite)    (1)
$2NH_3 + H_2O + 2SO_2 \rightarrow (NH_4)_2S_2O_5$ (ammonium pyrosulfite)    (2)
$2NH_3 + H_2O + SO_2 \rightarrow (NH_4)_2SO_3$ (ammonium sulfite)    (3)

One method for recycling the solid compounds from storage area 12 is shown with solid lines and is explained later in more detail with reference to FIG. 2. A second method for recycling the solid compounds from storage area 12 is characterized by the dotted lines and item 13a. In this second method, carbon monoxide at a temperature above 140°F, and preferably at 200°F is passed through the solid compounds from storage area 12 in the absence of oxygen until substantially all of the solid compounds have been converted to sulfur and ammonia. The solid compounds from storage area 12 may be ammonium sulfite, ammonium pyrosulfite, ammonium bisulfite or any combination of the two or more of these ammonium compounds. The principal reactions which are involved can be described generally as follows:

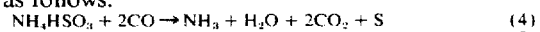
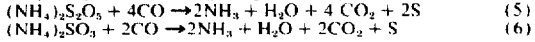

$NH_4HSO_3 + 2CO \rightarrow NH_3 + H_2O + 2CO_2 + S$    (4)
$(NH_4)_2S_2O_5 + 4CO \rightarrow 2NH_3 + H_2O + 4CO_2 + 2S$    (5)
$(NH_4)_2SO_3 + 2CO \rightarrow 2NH_3 + H_2O + 2CO_2 + S$    (6)

If the solids are vaporized upon addition of carbon monoxide, the reaction involves simply:

$SO_2 + 2CO \rightarrow 2CO_2 + S$    (7)

in the presence of ammonia and water vapor. The ammonia recovered is used as a source of ammonia 14 for continuing the purification process.

Figure 4:
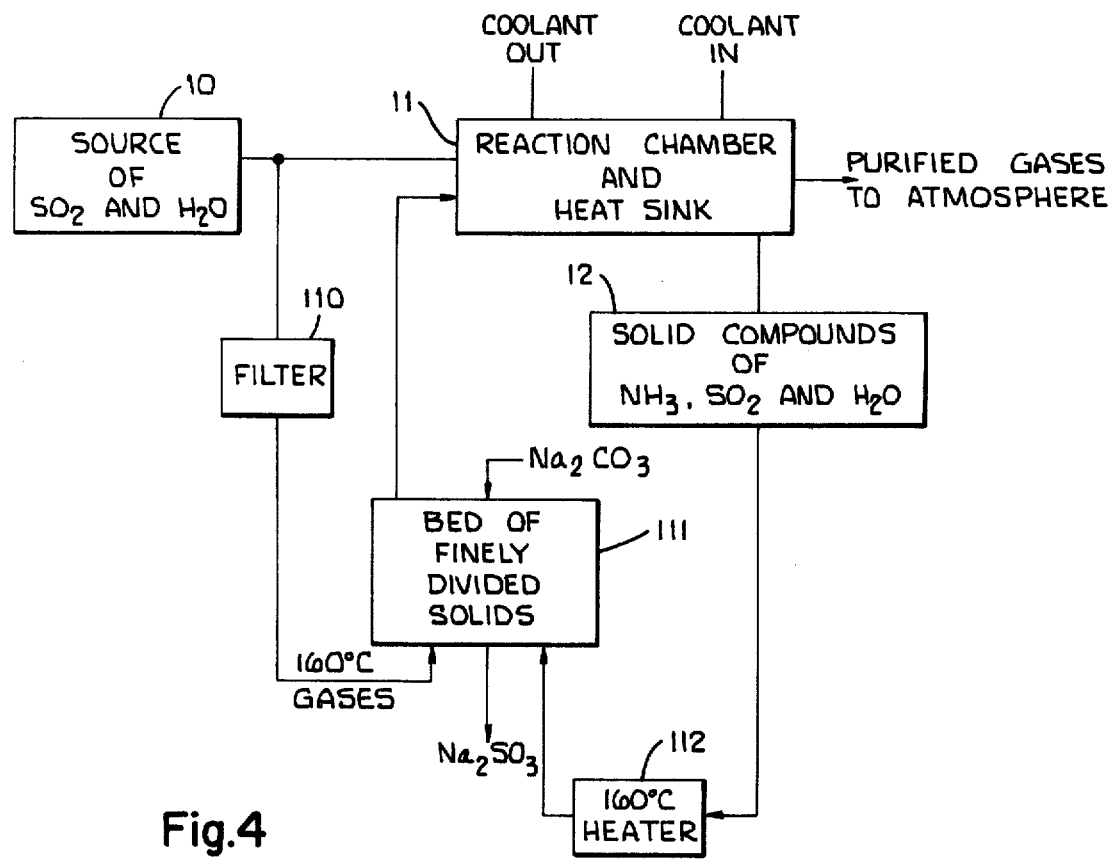
FIG. 4 is a block diagram of the invention incorporating an alternate recycling process.

A third method for recycling the solid compounds from storage area 12 is illustrated in FIG. 4. In this third method the solid compounds are vaporized and heated to 160°C in a heater 112. The heated vapors are passed through a bed 111 of finely divided sodium carbonate at 120°C. At this temperature, the sulfur dioxide will replace the carbon dioxide in the carbonate:

$$SO_2 + Na_2CO_3 \rightarrow Na_2SO_3 + CO_2$$

It has been found that other carbonates of any alkaline earth metals or alkali metals may be used, such as potassium carbonate, calcium carbonate or magnesium carbonate. It is essential, however, that the temperature of the carbonate and gases be at least 150°C for efficient conversion. If desired, a portion of the gases from source 10 may be filtered in filter 110 and also passed through the bed 111 of finely divided carbonate as a carrier for the gases from heater 112. The carbon dioxide and ammonia emerging from the top of bed 111 passes into the reaction chamber and heat sink 11.

Figure 2:
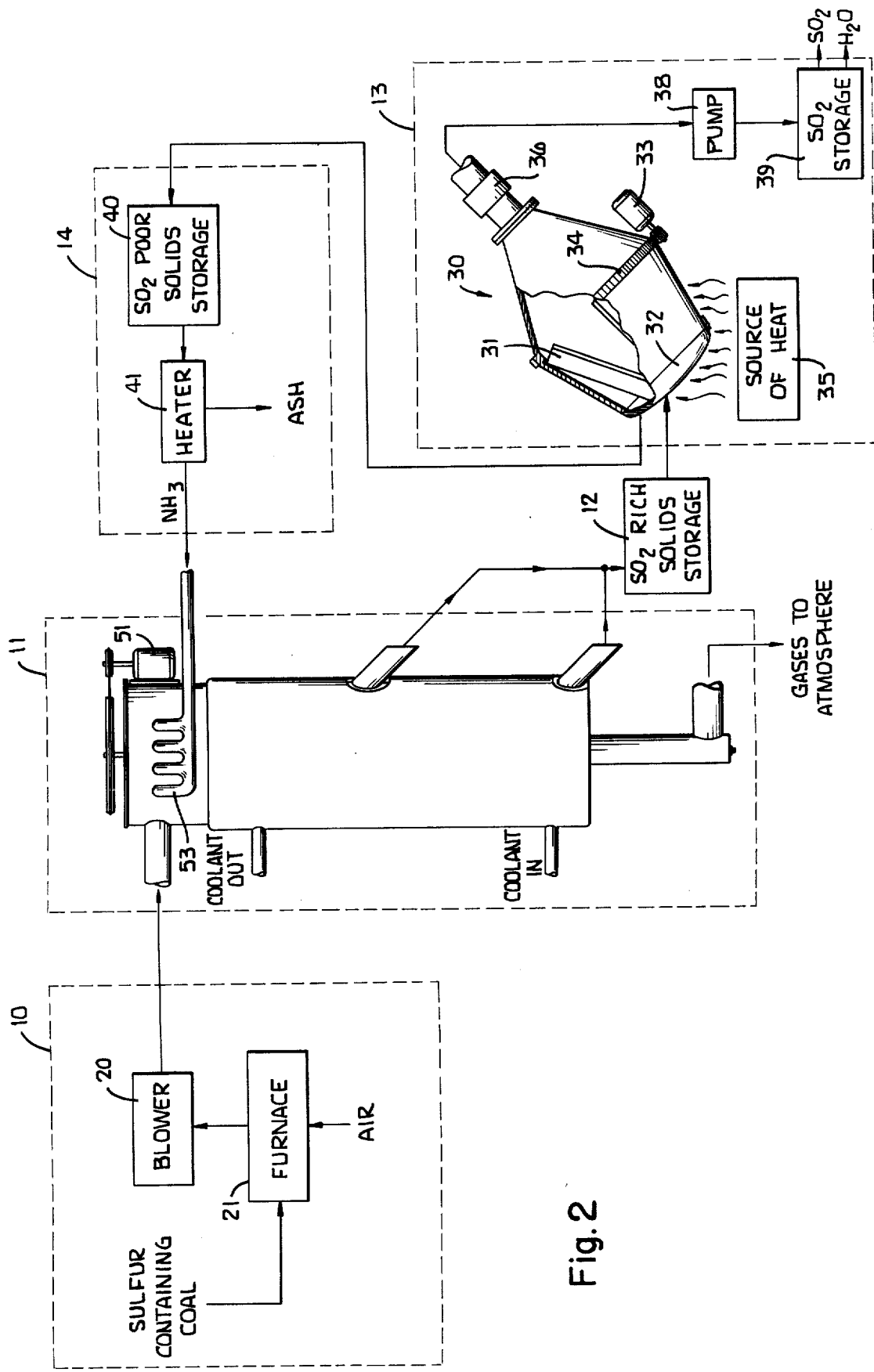
FIG. 2 illustrates in more detail certain portions of the block diagram of FIG. 1.
Figure 3:
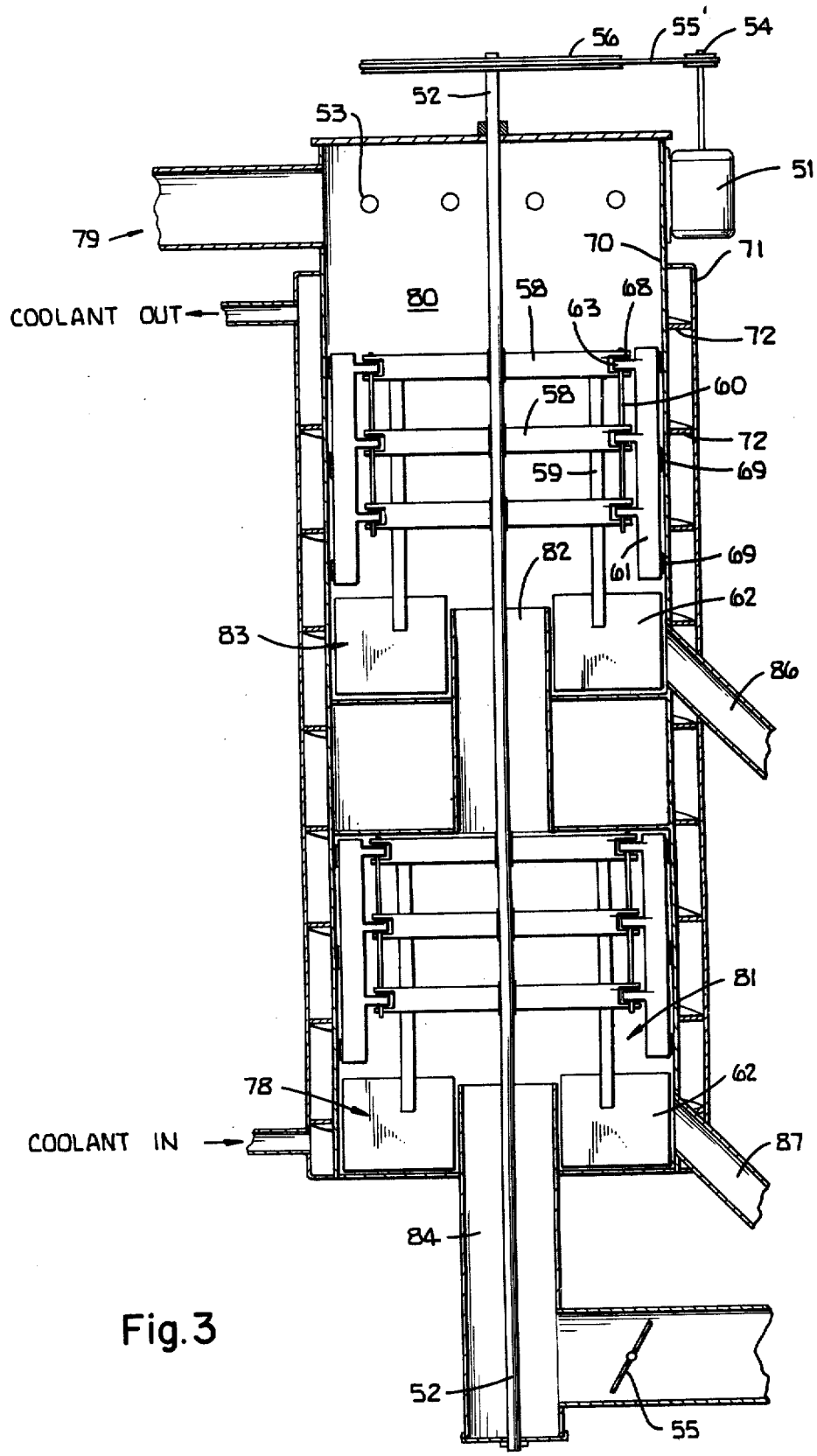
FIG. 3 illustrates in cross-section, the reaction chamber and heat sink of FIGS. 1 and 2.

Referring in particular to FIG. 2 there is illustrated as a source of $SO_2$ and $H_2O$, 10, a furnace 21 which burns sulfur-containing coal in air. The gases from furnace 21 are then compressed by a blower 20. Thus source 10 will produce combustion gases which contain sulfur dioxide and water vapor and which are under pressure. These gases then pass into reaction chamber and heat sink 11, the exterior of which is illustrated in FIG. 2 and the interior of which is illustrated in cross-section in FIG. 3. The reaction chamber and heat sink 11 has a gas inlet 79 which allows the gases to enter an upper chamber 80 where ammonia, which may be in the form of vaporized ammonium sulfite, is mixed with the gas and allowed to react. The inner surface 70 of the reaction chamber and heat sink is cylindrical and it is cooled by a coolant fluid in a fluid jacket 71 which is provided with spiraling members 72 to cause the fluid to uniformly contact and cool the surface 70. Because the surface is cooled and maintained at a temperature which is lower than the temperature of the gases in chamber 80, solids will precipitate on the surface 70. This cooled surface 70 serves as a heat sink to cause solids to preferentially form at the surface 70 rather than suspended within the gases in upper chamber 80. The chamber is preferably sized so that the velocity of the gases past the large surface 70 is below 500 ft./min. to encourage precipitation onto the surface, and in any event the velocity must be below 4,000 ft./min. to have any significant precipitation.

A motor 51 is provided to rotate a shaft 52 by means of belt 55' and pulleys 54 and 56. Affixed to shaft 52 are blade supporting arms 58 which extend radially from the shaft. A pivot pin 60 extends through the ends of the blade supporting arms 58 and provides for pivoting of blade 61 and its connecting portions 63. Blade 61 includes protruding tabs 69 which extend outwardly from the blade and allows for the blade to remove most of the solids being deposited on surface 70, while leaving a very thin layer (approx. 1 mm.) to remain on the surface 70 to encourage further precipitation from the gases in upper chamber 80. The tabs 69 are maintained positioned against the cyclindrical surface 70, as they revolve, by spring 68. The solids which are scraped from the cylindrical surface 70 by the blade 61 are deposited in an upper circular channel 83 and are subsequently removed from the channel 83 through an upper solids outlet 86 through the action of paddles 62 supported by a paddle supporting arm 59. The continuous rotation of blade 61 due to rotation of shaft 52 is in a circular path which is concentric with the cyclinder defined by surface 70.

Upper chamber 80 is connected to a lower chamber 81 through a connecting duct 82.

Lower chamber 81 is essentially identical to the lower portion of upper chamber 80 and it includes a lower circular channel 78 corresponding to the upper circular channel 83 and a lower solids outlet 87 corresponding to the upper solids outlet 86. Gas exits from the lower chamber through a gas outlet 84 and past a valve 55 which is used to maintain the desired pressure within the reaction chamber and heat sink. The solids from outlets 86 and 87 are stored in storage area 12.

The sulfur dioxide extraction equipment 13 of FIG. 1 is illustrated in greater detail in FIG. 2. The solids from the storage area 12 are inserted into a rotary kiln device 30 having an door 32 which is used for filling and emptying, internal blades 31 which are used to maintain agitation within the kiln 30 and a motor 33 which drives a circular row 34 of teeth to cause the kiln to rotate. A seal 36 is provided to allow the kiln to rotate while being affixed to a pump 38 for producing a vacuum within the kiln. Both sulfur dioxide and water will be removed by the vacuum provided by the pump 38 when a source of heat 35 is applied. The removed products are stored in area 39. The temperature within the kiln is preferably maintained at about 130°F. The principal reactions which are involved in the kiln are represented as follows:

$$2NH_4 HSO_3 \rightarrow (NH_4)_2 SO_3 + H_2O [\text{or} (NH_4)_2 SO_3 \cdot H_2O] + SO_2 \quad (8)$$
$$(NH_4)_2S_2O_5 \rightarrow (NH_4)_2 SO_3 + SO_2 \quad (9)$$

A small amount of water can be added to the ammonium pyrosulfite prior to reaction in the kiln to favor reaction (8) by conversion of the pyrosulfite to a bisulfite.

After much of the sulfur dioxide has been removed from the solids in the kiln, they are transferred to a sulfur-dioxide-poor solids storage area 40. These solids are then heated as needed to produce ammonia and sulfur dioxide and water vapor which are then added to the gases within the reaction chamber 80 through ammonia inlet 53. Alternately these solids could be added to the hot gases directly to obtain vaporization. Since the solids are principally ammonium sulfite there will be approximately 2 moles of ammonia added for every one mole of sulfur dioxide added to the reaction chamber. The principal reactions involved in the recycling of the ammonium sulfite obtained in reactions (8) and (9) are as follows:

$$(NH_4)_2SO_3 \rightarrow 2NH_3 + H_2O + SO_2 \text{ (Vapors added to gases or formed in the gases)} \quad (10)$$
$$H_2O + SO_3 + [2NH_3 + H_2O + SO_2] \rightarrow 2NH_4 HSO_3 \text{ (Solid precipitate)} \quad (11)$$
$$SO_2 + [2NH_3 + H_2O + SO_2] \rightarrow (NH_4)_2S_2O_5 \text{ (Solid precipitate)} \quad (12)$$

Thus, there has been provided, in accordance with above described preferred embodiments, highly efficient and simple methods for purification of gases containing sulfur dioxide impurities. While there have been described above the principles of these inventions in connection with specific processes and apparatus, it is clearly understood that this description is made only by way of example and not as a limitation to the scope of the invention.

I claim:

1. A dry process for reducing $SO_2$ content of gases containing $SO_2$, ammonia and water vapor which comprises:

a. passing gases containing $SO_2$, ammonia and water vapor past a solid heat sink having a surface area maintained below the temperature of the gases,
   1. the velocity of the gases passed past the heat sink being sufficiently slow and
   2. the temperature of the heat sink being maintained such that solid compounds of $SO_2$, ammonia and water precipitate onto the surface of the heat sink.

mechanically removing solids accumulating on the heat sink.

2. The process of claim 1 in which the velocity of the gases passed the heat sink is below 500 ft./min.

3. The process of claim 1 in which the temperature of the heat sink is maintained below 200°F.

4. The process of claim 3 in which the temperature of the heat sink is maintained at about 170°F.

5. The process of claim 1 in which the mechanical removal step leaves a uniform layer of solids on the heat sink.

6. The process of claim 5 in which the layer is about 1 mm. thick.

7. The process of claim 1 in which the mechanical removing is accomplished continuously.

8. The process of claim 1 in which the gases used are obtained by vaporizing $(NH_4)_2 SO_3$ and adding the vapors to gases containing $SO_2$.

9. The process of claim 8 in which the $(NH_4)_2 SO_3$ of the preceding step is obtained by subjecting solids containing $NH_4HSO_3$ to heat in a vacuum whereby much of the $NH_4HSO_3$ in the solids is converted to $(NH_4)_2 SO_3$.

10. The process of claim 1 which includes the step of subjecting solids which have been mechanically removed from the heat sink to carbon monoxide gas to obtain ammonia which is added to the gases and elemental sulfur and carbon dioxide as by-products.

11. A dry process for reducing $SO_2$ content of gases containing $SO_2$, ammonia and water vapor which comprises:
   a. passing gases containing $SO_2$, ammonia and water vapor past a solid heat sink having a surface area maintained at a temperature which is below 200°F. and which will cause solids to precipitate from the gases, the velocity of the gases being below 500 feet per minute and
   b. mechanically removing in a continuous manner the solids which accumulate on the heat sink.

12. The process of claim 11 in which the mechanically removing leaves a uniform layer of solids about 1 millimeter thick on the surface of the heat sink.

13. The process of claim 12 in which the temperature of the heat sink is maintained at about 170°C.

* * * * *